United States Patent
Wright et al.

(10) Patent No.: US 9,121,465 B2
(45) Date of Patent: Sep. 1, 2015

(54) BLEED OUTLET STRUCTURE FOR A BLEED VALVE

(75) Inventors: Andrew L Wright, Derby (GB); Paul M Kirton, Loughborough (GB)

(73) Assignee: ROLLS-ROYCE PLC, London (GB)

( * ) Notice: Subject to any disclaimer, the term of this patent is extended or adjusted under 35 U.S.C. 154(b) by 776 days.

(21) Appl. No.: 13/214,668

(22) Filed: Aug. 22, 2011

(65) Prior Publication Data

US 2012/0067061 A1    Mar. 22, 2012

(30) Foreign Application Priority Data

Sep. 21, 2010 (GB) .................................. 1015743.6

(51) Int. Cl.
| | |
|---|---|
| F02C 9/18 | (2006.01) |
| F16F 5/00 | (2006.01) |
| F02K 3/02 | (2006.01) |
| F02C 6/08 | (2006.01) |
| F02K 3/075 | (2006.01) |

(52) U.S. Cl.
CPC ... *F16F 5/00* (2013.01); *F02K 3/02* (2013.01); *F02C 6/08* (2013.01); *F02K 3/075* (2013.01); *F05D 2240/129* (2013.01); *F05D 2250/312* (2013.01); *F05D 2250/52* (2013.01)

(58) Field of Classification Search
CPC .............. F02C 6/08; F02C 3/02; F02C 3/075
USPC ............... 60/782, 785; 239/433, 434.5, 428.5
See application file for complete search history.

(56) References Cited

U.S. PATENT DOCUMENTS

| | | | | |
|---|---|---|---|---|
| 2,904,972 | A | * | 9/1959 | Smilack .......................... 62/280 |
| 3,153,906 | A | * | 10/1964 | Marchant ..................... 60/226.1 |
| 3,160,368 | A | * | 12/1964 | Young et al. ................. 244/76 J |
| 3,164,337 | A | * | 1/1965 | Hooper ......................... 244/12.5 |
| 4,463,552 | A | * | 8/1984 | Monhardt et al. ........... 60/226.1 |
| 4,546,605 | A | * | 10/1985 | Mortimer et al. ............ 60/226.1 |
| 5,155,993 | A | | 10/1992 | Baughman et al. |
| 5,351,473 | A | * | 10/1994 | Shuba ............................. 60/782 |
| 6,581,217 | B2 | * | 6/2003 | Marcos .......................... 4/541.1 |
| 7,415,827 | B2 | * | 8/2008 | Bertolotti et al. ............... 60/752 |

(Continued)

FOREIGN PATENT DOCUMENTS

| | | |
|---|---|---|
| EP | 1 300 567 A2 | 4/2003 |
| EP | 1 892 399 A2 | 2/2008 |

(Continued)

OTHER PUBLICATIONS

Search Report issued in British Application No. GB1015743.6 dated Jan. 18, 2011.

(Continued)

*Primary Examiner* — Phutthiwat Wongwian
*Assistant Examiner* — Lorne Meade
(74) *Attorney, Agent, or Firm* — Oliff PLC

(57) ABSTRACT

A bleed valve having an inlet port and an outlet port. The bleed valve comprises mutually perpendicular radial, longitudinal and tangential axes arranged such that the outlet port is substantially in a plane defined by the longitudinal and tangential axes. The bleed valve also comprises at least one vane spanning the outlet port and having a first side and a second side, the first side being closer to the inlet port than the second side. The at least one vane defining a vector from its first to its second side that has non-zero radial, longitudinal and tangential components.

8 Claims, 3 Drawing Sheets

(56) References Cited

U.S. PATENT DOCUMENTS

| | | |
|---|---|---|
| 7,624,581 B2 * | 12/2009 | Moniz ............................. 60/785 |
| 7,921,652 B2 | 4/2011 | Kirby |
| 7,946,528 B2 * | 5/2011 | Yoeli ......................... 244/76 R |
| 8,128,347 B2 * | 3/2012 | Sokhey ........................ 415/144 |
| 8,484,982 B2 * | 7/2013 | Martensson et al. ............ 60/785 |
| 8,516,827 B2 * | 8/2013 | Kirby ............................. 60/782 |
| 8,683,812 B2 * | 4/2014 | Bertolotti et al. ............... 60/785 |
| 2001/0042368 A1 | 11/2001 | Negulescu |
| 2006/0277919 A1 * | 12/2006 | Martensson et al. ............ 60/785 |
| 2008/0050218 A1 * | 2/2008 | Sokhey ........................ 415/119 |
| 2008/0053105 A1 | 3/2008 | Appleby et al. |
| 2010/0043447 A1 | 2/2010 | Kirby |
| 2010/0180573 A1 | 7/2010 | Ruston |
| 2010/0281874 A1 * | 11/2010 | Rice ............................... 60/770 |
| 2011/0265490 A1 * | 11/2011 | Klasing et al. ................. 60/785 |

FOREIGN PATENT DOCUMENTS

| | | |
|---|---|---|
| EP | 2 083 164 A2 | 7/2009 |
| EP | 2 184 448 A2 | 5/2010 |
| EP | 2 372 107 A2 | 10/2011 |
| GB | 1 316 084 A | 5/1973 |
| WO | WO 2006/091142 A1 | 8/2006 |

OTHER PUBLICATIONS

Jul. 9, 2015 Search Report issued in European Application No. EP 11 17 8269.

* cited by examiner

BLEED OUTLET STRUCTURE FOR A BLEED VALVE

The present invention relates to a bleed valve, particularly although not exclusively to a bleed valve for a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. An array of bleed valves 34, of which one is illustrated, is provided to selectively extract air from the intermediate pressure compressor 16 and to expel it into the bypass duct 32. The bleed valves 34 are opened to extract air to reduce the surge margin of the compressor. An array of bleed valves 34 may also be provided to selectively extract air from the high pressure compressor 18 (not illustrated).

Conventional bleed valves 34 comprise an outlet port that couples the bleed valve 34 to the bypass duct 32. The outlet port causes air to be expelled as a cohesive or disparate plume. The bypass duct 32 has relatively restricted radial extent and may comprise a heat intolerant material. Therefore, it is important that the plume of expelled air is turbulently mixed with axial airflow B to reduce its heat before it contacts the radially outer wall 36 of the bypass duct 32. Similarly it is beneficial that the plume is well mixed with airflow B before it is entrained against the radially inner wall 38 of the bypass duct 32 at a location downstream of the bleed valve 34.

Prior art bleed valves 34 have sought to improve the mixing of the expelled plume with airflow B by providing an outlet port comprising a perforated plate that causes air to be expelled as a plume composed of multiple jets. A similar effect has been achieved using vanes. The perforations or vanes are typically angled to point either downstream or upstream, relative to axial airflow B in order to increase the plume length in a given radial distance across the bypass duct 32. However, it has been found in use that insufficient mixing occurs and that a substantially coherent plume tends to reach the outer bypass duct wall 36, damaging and potentially penetrating the nacelle 30 inner wall, or to be entrained against the inner bypass duct wall 38 if the downstream angle is more axial than radial, damaging the inner bypass duct wall 38.

Various complex bleed valve 34 outlet port configurations have been proposed but without successfully alleviating the damaging effects of a bleed valve plume contacting a wall 36, 38 of the bypass duct 32.

The present invention provides a bleed valve that seeks to address the aforementioned problems.

Accordingly the present invention provides a bleed valve having an inlet port and an outlet port, the bleed valve comprising mutually perpendicular radial, longitudinal and tangential axes arranged such that the outlet port is substantially in a plane defined by the longitudinal and tangential axes; and at least one vane spanning the outlet port and having a first side and a second side, the first side being closer to the inlet port than the second side, and the at least one vane defining a vector from its first to its second side that has non-zero radial, longitudinal and tangential components.

Advantageously such a bleed valve increases the radial distance that a bleed valve plume travels before contacting another component and being more diffused and mixed with another flow in that distance. Thus the plume is cooler when it makes contact, reducing the amount of damage caused.

The bleed valve may comprise multiple vanes that are arranged to be parallel to each other.

The vector may be greater than 0° and smaller than 180° from the longitudinal axis. More specifically, the vector may be greater than 10° and smaller than 170° from the longitudinal axis. Still more specifically, the vector may be greater than 25° and smaller than 155° from the longitudinal axis. in particular embodiments the vector may be substantially equal to 40° from the longitudinal axis or substantially equal to 140° from the longitudinal axis. The angle may be chosen to optimise the flow path of the air expelled from the bleed valve.

The radial, longitudinal and tangential vector components may be defined such that a fluid plume expelled through the outlet port has a predetermined radial extent.

The present invention also provides a gas turbine engine having a principal engine axis and a bleed valve as described wherein the longitudinal axis is parallel to the principal engine axis and the radial axis is parallel to an engine radius.

The gas turbine engine may comprise a bypass duct wherein the outlet port is located in a radially inner wall of the bypass duct. The gas turbine engine may comprise at least one annular array of bleed valves.

The radial, longitudinal and tangential vector components may be defined such that a fluid plume expelled through the outlet port has a predetermined radial extent relative to the bypass duct.

The present invention will be more fully described by way of example with reference to the accompanying drawings, in which.

Figure 1:
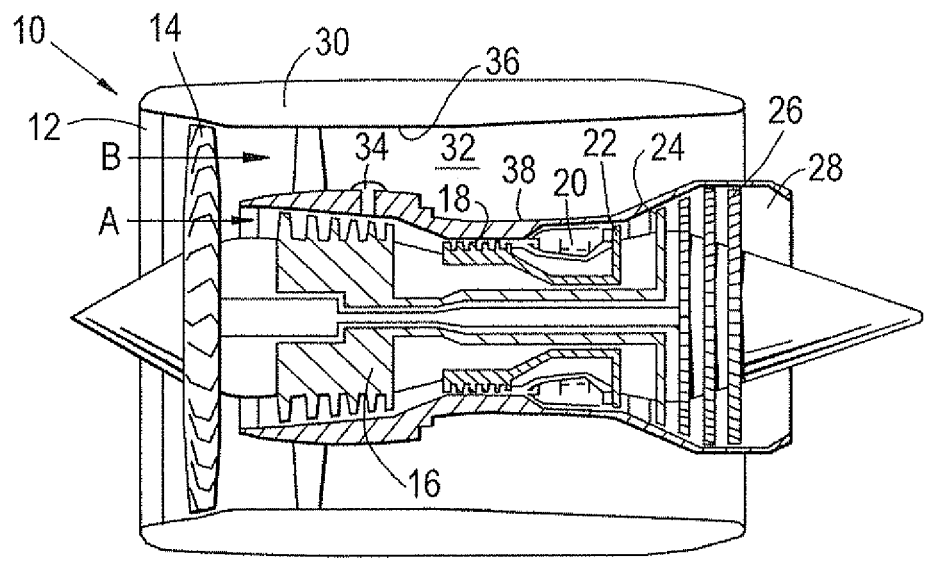
FIG. 1 is a sectional side view of a gas turbine engine comprising a bleed valve.
Figure 2:
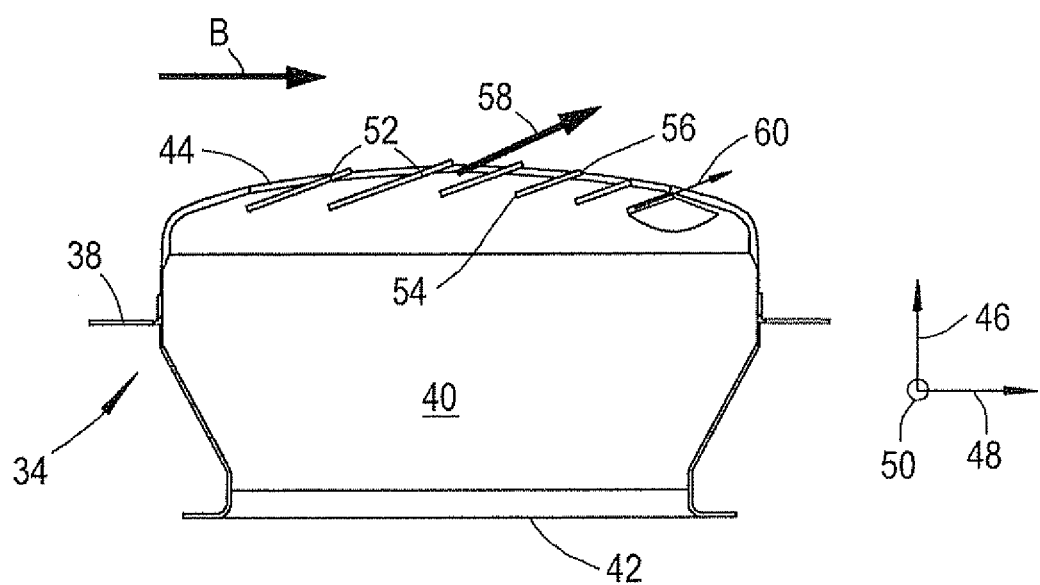
FIG. 2 is a schematic side view of a bleed valve according to the present invention.

A bleed valve 34 is shown in FIG. 2 that protrudes through the radially inner bypass duct wall 38, a part of which is shown. The bleed valve 34 comprises a body 40 that is bounded by an inlet port 42 and an outlet port 44. The body 40 may be cylindrical or may be a prism based on an oval or ellipse, for example, as is well understood in the art. Alternatively the inlet port 42 and outlet port 44 may be different shapes and the body 40 shaped to transition between the ports 42, 44. A set of mutually perpendicular co-ordinate axes is defined for the bleed valve 34, being a radial axis 46, a longitudinal axis 48 and a tangential axis 50. The vector extending between the inlet port 42 and the outlet port 44 lies on or parallel to the radial axis 46 whilst each of the inlet and outlet ports 42, 44 lie substantially in a plane defined by the longitudinal and tangential axes 48, 50.

The bleed valve 34 comprises multiple parallel vanes 52 that span the outlet port 44 in an array, Each vane 52 extends between a first side 54 and a second side 56, the first side 54 being positioned closer to the inlet port 42 than the second side 56. The vanes 52 are angled so that bleed flow that enters the body 40 of the bleed valve 34 through the inlet port 42 in a substantially radial direction is diverted to be expelled through the outlet port 44, as shown by arrow 58, in a more downstream direction with respect to the bypass airflow B.

Figure 3:
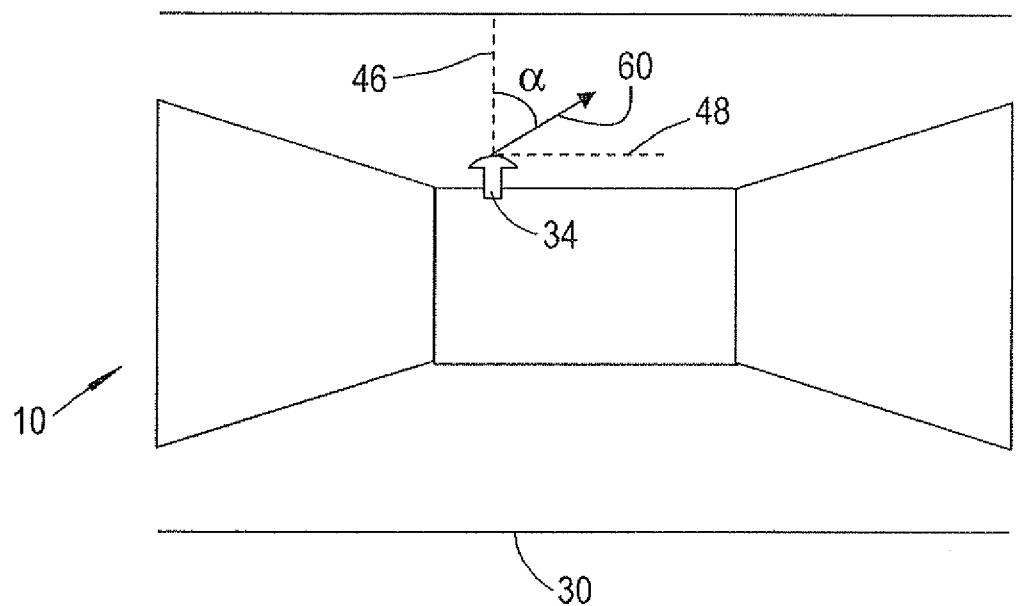
FIG. 3 is a schematic side view of a gas turbine engine comprising a bleed valve according to the present invention.
Figure 4:
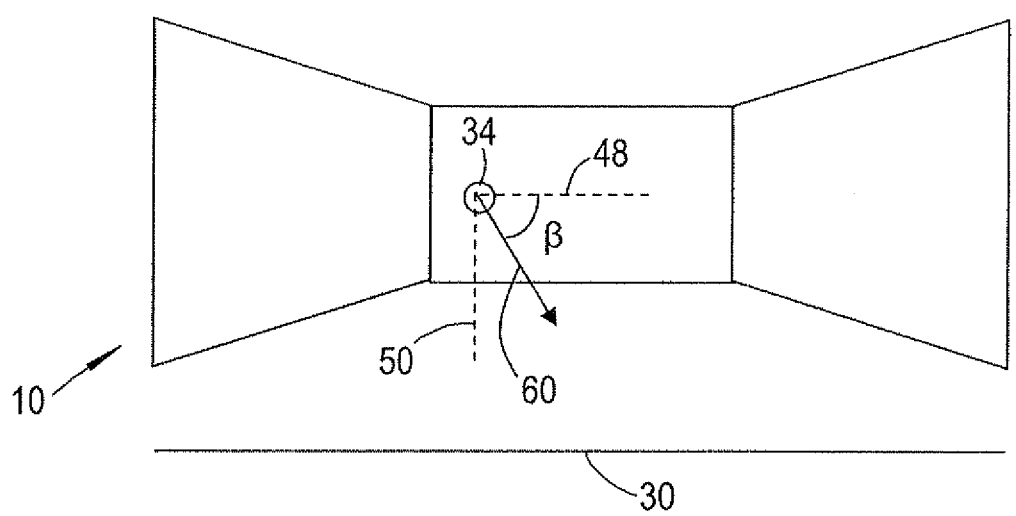
FIG. 4 is a schematic plan view of the gas turbine engine of FIG. 3.

Each vane 52 defines a vector 60 from its first side 54 to its second side 56. The vector 60 has non-zero components in the radial, longitudinal and tangential directions, whereas prior art vanes have always comprised a zero tangential component. Thus the vector 60 can be written as [r,l,t] where r is the radial component, l is the longitudinal component, t is the tangential component and r,l,t≠0. The vector 60 is illustrated in FIGS. 3 and 4. Each illustrates a gas turbine engine 10 having a nacelle 30 surrounding the core engine and an exemplary bleed valve 34.

FIG. 3 is a view in a plane parallel to the radial and longitudinal axes 46, 48 of the bleed valve 34. The vector 60 defined by the vanes 52 of the bleed valve 34 makes an angle a with the radial axis 46, or an angle of (90-α) degrees with the longitudinal axis 48. FIG. 4 is a view in a plane parallel to the longitudinal and tangential axes 48, 50 of the bleed valve 34. Similarly, the vector 60 defined by the vanes 52 of the bleed valve 34 makes an angle β with the longitudinal axis 48, or an angle (90-β) degrees with the tangential axis 50. Thus the vector 60 extends in three-dimensions at a compound angle comprising α and β.

Figure 5:
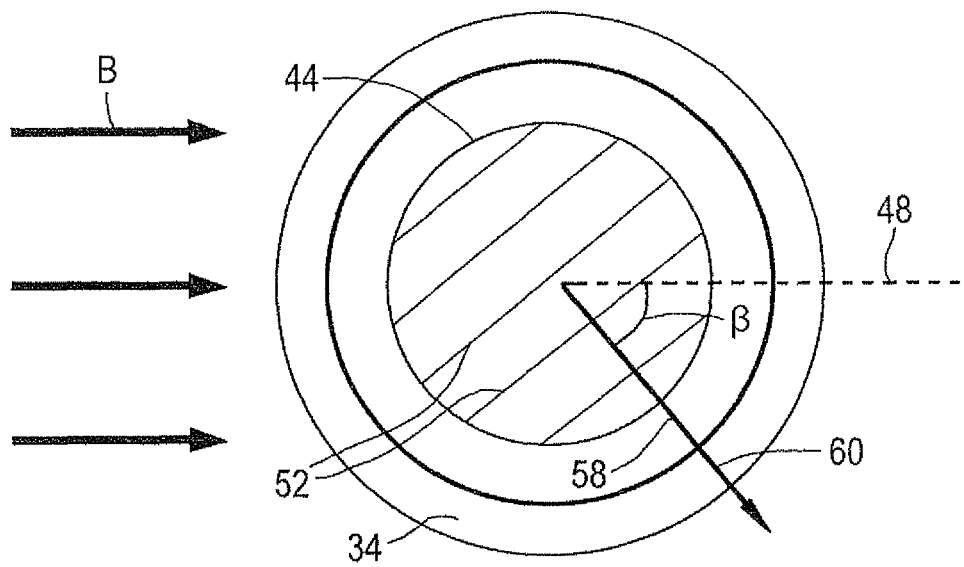
FIG. 5 is a plan view of a bleed valve according to the present invention.

FIG. 5 shows a bleed valve 34 according to the present invention that comprises vanes 52 spanning the outlet port 44. The vanes 52 are arranged as an array of multiple parallel vanes 52 to expel air 58 parallel to the vector 60. The vector 60 defined between the first and second sides 54, 56 extends perpendicular to the vanes 52 in the plane illustrated. As in FIG. 4, the vector 60 extends at an angle β to the longitudinal axis 48, which is also the direction of the bypass flow B.

Figure 6:
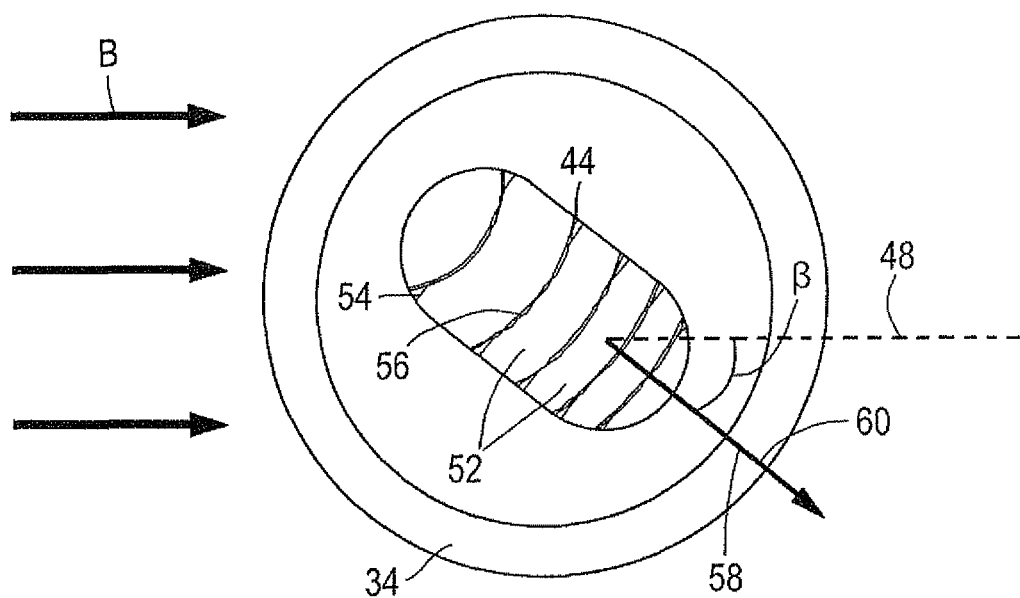
FIG. 6 is a plan view of an alternative bleed valve according to the present invention.

FIG. 6 shows an alternative form of a bleed valve 34 according to the present invention. In this embodiment the outlet port 44 of the bleed valve 34 is an elongate racetrack shape in the illustrated plane, that is, it is formed of a pair of spaced semi-circular portions linked by straight sides to form a closed figure. The vanes 52 span the width of the outlet port 44, between the parallel straight sides, and are angled at angle α to the radial axis 46. The racetrack outlet port 44 is arranged so that the straight sides are parallel to the vector 60 and the expelled air 58, and at angle β to the longitudinal axis 48 and the bypass airflow B. It will be apparent to the skilled reader that the inlet port 42 may be the same shape as the outlet port 44 or may be a different shape. In the latter case, the body 40 of the bleed valve 34 has a complex shape to connect the inlet port 42 to the outlet port 44.

Although the bleed valve 34 according to the present invention has been described having an outlet port 44 that is circular or racetrack shaped, it will be apparent to the skilled reader that it is the angles α, β made by the vector 60 with the axes 46, 48, 50 that are critical to the invention and not the shape of the outlet port 44. Similarly, the vanes 52 may be substantially rectangular or may have a curved second side 56, depending on the requirements of the specific application of the bleed valve 34.

Although it is envisaged that the vanes 52 will be fixed at specified angles a, 13 in a parallel array relative to the outlet port 44 of the bleed valve 34, it is also within the scope of the claimed invention that the vanes 52 are pivotable to form an array at a different angle α, a different angle β or a combination of different angles α, β. It is beneficial that the vanes 52 forming an array are aligned parallel to each other so that air expelled 58 through the gaps between adjacent vanes 52 flows in parallel to form a cohesive plume that flows parallel to vector 60.

Beneficially, the plume expelled from the bleed valve 34 of the present invention travels further in an annular duct such as the bypass duct 32 of a gas turbine engine 10 than the plume expelled from a prior art bleed valve. This gives more time and distance for the plume to mix with the bypass flow B which results in more heat dissipation before the plume contacts either the radially outer bypass duct wall 36 or the radially inner bypass duct wall 38. Thus less damage to the walls 36, 38 is likely to result. It has been found that setting angle α to 70° and angle β to 40°, or 140° for upstream flow, is particularly good for dissipating heat from the plume before it contacts the walls 36, 38. For example, the vector 60 may advantageously be at an angle β that is greater than 25° but smaller than 155° or in other applications be at angle β that is greater than 10° but smaller than 170°. More generally, there is a requirement that angle α is greater than 0° and smaller than 90° whilst angle β is greater than 0° and smaller than 180°. However, different angles will be more appropriate for different engines 10 and for different locations of bleed valves 34 in the same engine 10. For example, an array of bleed valves 34 around the intermediate pressure compressor 16 may define vectors 60 that are different to the vectors 60 for an array of bleed valves 34 located around the high pressure compressor 18.

The bleed valve 34 of the present invention is mechanically simpler than previous bleed valves using perforated plates or vanes to split the plume into disparate jets to promote mixing. An annular array of bleed valves 34 according to the present invention may comprise identical bleed valves 34 or each may be tailored for its location, for example with the vector 60 aligned so that the expelled plume misses local sensitive hardware such as ventilation inlets, thrust reverser doors and so forth.

The invention claimed is:

1. A gas turbine engine having a principal engine axis, the engine comprising:
   a radially inner wall of a bypass duct;
   a bleed valve; and
   a bleed outlet structure for the bleed valve, the bleed outlet structure comprising:
      an inlet port;
      an outlet port positioned farther from the principal engine axis than the inlet port, the outlet port located in the radially inner wall;
      a coordinate system comprising mutually perpendicular radial axis, longitudinal axis, and tangential axis arranged such that the outlet port is substantially in a plane defined by the longitudinal axis and the tangential axis; and
      a vane spanning the outlet port, the vane having a first side and a second side, the first side being closer to the inlet port than the second side, the vane positioned between the inlet port and the outlet port, the vane including a solid surface extending from the first side to the second side, the first side and the solid surface forming an edge that is parallel to the plane, the vane oriented so that a vector perpendicular to the edge and parallel to the solid surface has, relative to the coordinate system, a non-zero radial component, a non-zero longitudinal component, and a non-zero tangential component,
      wherein the longitudinal axis is parallel to the principal engine axis and the radial axis is parallel to a radial axis of the gas turbine engine.

2. A gas turbine engine as claimed in claim 1 further comprising multiple vanes positioned between the inlet port and the outlet port, the multiple vanes arranged to be parallel to the vane spanning the outlet port.

3. A gas turbine engine as claimed in claim 1 wherein the vane is oriented so that the non-zero longitudinal component of the vector forms an angle greater than 0° and smaller than 180° from the longitudinal axis.

4. A gas turbine engine as claimed in claim 3 wherein the vane is oriented so that the non-zero longitudinal component of the vector forms an angle greater than 10° and smaller than 170° from the longitudinal axis.

5. A gas turbine engine as claimed in claim 4 wherein the vane is oriented so that the non-zero longitudinal component of the vector forms an angle greater than 25° and smaller than 155° from the longitudinal axis.

6. A gas turbine engine as claimed in claim 5 wherein the vane is oriented so that the non-zero longitudinal component of the vector forms an angle substantially equal to 40° from the longitudinal axis.

7. A gas turbine engine as claimed in claim 5 wherein the vane is oriented so that the non-zero longitudinal component of the vector forms an angle substantially equal to 140° from the longitudinal axis.

8. A gas turbine engine as claimed in claim 1 wherein the non-zero radial component, the non-zero longitudinal component, and the non-zero tangential component of the vector are defined such that a fluid plume expelled through the outlet port has a predetermined radial extent relative to the bypass duct.

* * * * *